(12) United States Patent
Noguchi

(10) Patent No.: US 12,704,598 B2
(45) Date of Patent: Aug. 11, 2026

(54) INFORMATION PROCESSING DEVICE, INFORMATION PROCESSING METHOD, PROGRAM, AND RECORDING MEDIUM

(71) Applicants: PIONEER CORPORATION, Tokyo (JP); PIONEER SMART SENSING INNOVATIONS CORPORATION, Tokyo (JP)

(72) Inventor: Ryoji Noguchi, Kawagoe (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 525 days.

(21) Appl. No.: 18/549,885

(22) PCT Filed: Mar. 12, 2021

(86) PCT No.: PCT/JP2021/010093
§ 371 (c)(1),
(2) Date: Oct. 24, 2023

(87) PCT Pub. No.: WO2022/190364
PCT Pub. Date: Sep. 15, 2022

(65) Prior Publication Data

US 2024/0159872 A1 May 16, 2024

(51) Int. Cl.
*G01S 7/48* (2006.01)
*G01S 17/08* (2006.01)

(52) U.S. Cl.
CPC ............ *G01S 7/4802* (2013.01); *G01S 17/08* (2013.01)

(58) Field of Classification Search
CPC ...... G01S 7/4802; G01S 17/08; G01S 7/4808; G01S 17/42; G01S 17/931
See application file for complete search history.

(56) References Cited

U.S. PATENT DOCUMENTS

2008/0062010 A1 3/2008 Kobayashi et al.
2014/0062762 A1* 3/2014 Kurono .................. G01S 7/354 342/146
2015/0310277 A1 10/2015 Schertler
(Continued)

FOREIGN PATENT DOCUMENTS

JP 2008-067086 A 3/2008
JP 2008-082750 A 4/2008
(Continued)

OTHER PUBLICATIONS

European Patent Office, Extended European Search Report, Application No. 21930216.3, dated Nov. 18, 2024, in 10 pages.
(Continued)

*Primary Examiner* — Michael E Teitelbaum
(74) *Attorney, Agent, or Firm* — Procopio, Cory, Hargreaves & Savitch LLP

(57) ABSTRACT

In the information processing device, the acquisition means receives reflected light corresponding to irradiation light and acquires a measurement data. The detection means detects a pair of areas for which symmetry of the measurement data becomes equal to or higher than a predetermined level. The estimation means estimates a height of a middle of the pair of areas as a ground height.

10 Claims, 3 Drawing Sheets

(56) References Cited

U.S. PATENT DOCUMENTS

2015/0355333 A1* 12/2015 Ono .................... G05D 1/024
356/4.01
2019/0242983 A1 8/2019 Yokota et al.
2021/0132201 A1* 5/2021 Voynov ................ G01S 7/497

FOREIGN PATENT DOCUMENTS

JP 2011-232230 A 11/2011
JP 2018-021788 A 2/2018
JP 2019-138630 A 8/2019

OTHER PUBLICATIONS

Patent Cooperation Treaty, International Search Report, Application No. PCT/JP2021/010093, dated Apr. 27, 2021, in 4 pages.

* cited by examiner

INFORMATION PROCESSING DEVICE, INFORMATION PROCESSING METHOD, PROGRAM, AND RECORDING MEDIUM

CROSS-REFERENCE TO RELATED APPLICATIONS

This application is a US National Stage of International Patent Application PCT/JP2021/010093, filed Mar. 12, 2021 the contents of which are incorporated herein by reference.

TECHNICAL FIELD

The present invention relates to a technique for acquiring information around a movable body.

BACKGROUND ART

Conventionally, a ranging device is known for detecting reflected light from a measurement object by irradiating light to the measurement object and calculating a distance to the measurement object by a time difference between the timing of irradiating the light to the measurement object and the timing of detecting the reflected light from the measurement object. Patent Document 1 discloses a front vehicle recognition device for changing a lighting pattern based on a detection state of a light emission pattern and detecting a distance and inclination to the front vehicle.

PRECEDING TECHNICAL REFERENCES

Patent Document

Patent Document 1: Japanese Patent Application Laid-Open under No. JP 2008-082750

SUMMARY

Problem to be Solved by the Invention

When detecting objects or the like existing in surroundings of a vehicle by using a ranging device using a laser beam such as a lidar, if a road surface is wet due to rain or the like, since the road surface data that can be ranged by the lidar is greatly reduced, it becomes difficult to estimate a height of a ground.

As a problem to be solved by the present invention, the above-described one is as an example. An object of the present invention is to estimate a height of a ground correctly even when the road surface is wet.

Means for Solving the Problem

The present invention described in the claim, there is provided an information processing device comprising:

- an acquisition means configured to receive reflected light corresponding to irradiation light and acquire a measurement data;
- a detection means configured to detect a pair of areas for which symmetry of the measurement data becomes equal to or higher than a predetermined level; and
- an estimation means configured to estimate a height of a middle of the pair of areas as a ground height.

The present inventions described in other claims, there is provided an information processing method executed by the information processing device comprising:

- receiving reflected light corresponding to irradiation light and acquiring a measurement data;
- detecting a pair of areas for which symmetry of the measurement data becomes equal to or higher than a predetermined level; and
- estimating a height of a middle of the pair of areas as a ground height.

The present inventions described in other claims, there is provided a program which causes a computer to execute processing of:

- receiving reflected light corresponding to irradiation light and acquiring a measurement data;
- detecting a pair of areas for which symmetry of the measurement data becomes equal to or higher than a predetermined level; and
- estimating a height of a middle of the pair of areas as a ground height.

EMBODIMENTS

Figure 1:
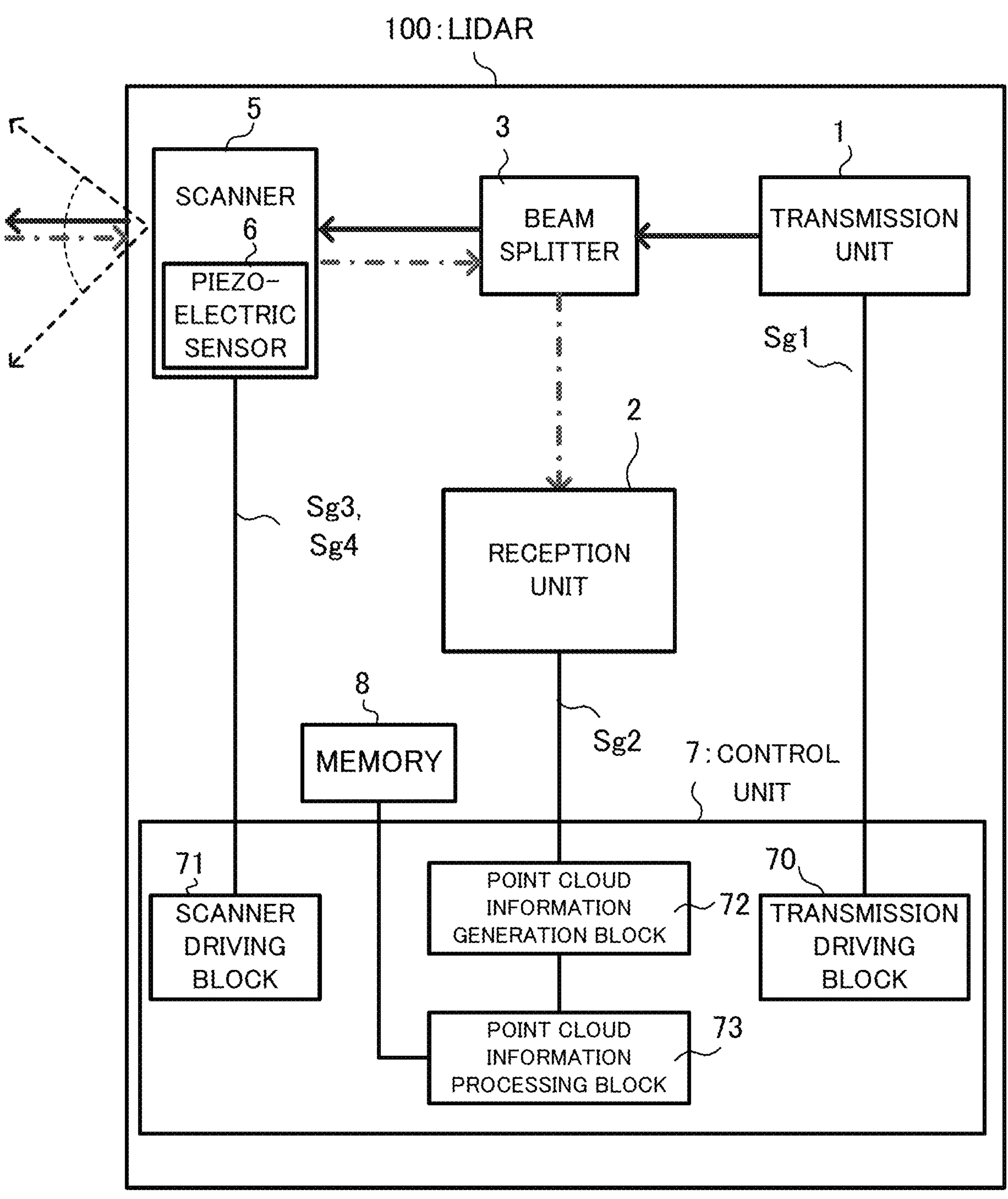
FIG. 1 shows a schematic configuration of a lidar according to an embodiment.

In a preferred embodiment of the present invention, the information processing device comprises: an acquisition means configured to receive reflected light corresponding to irradiation light and acquire a measurement data; a detection means configured to detect a pair of areas for which symmetry of the measurement data becomes equal to or higher than a predetermined level; and an estimation means configured to estimate a height of a middle of the pair of areas as a ground height.

In the information processing device described above, the acquisition means receives reflected light corresponding to irradiation light and acquires a measurement data, the detection means detects a pair of areas for which symmetry of the measurement data becomes equal to or higher than a predetermined level, and the estimation means estimates a height of a middle of the pair of areas as a ground height. Thus, even when the road surface is wet, the ground height can be estimated correctly.

In one aspect of the information processing device described above, the detection means detects a pair of areas for which at least symmetry of a reflection intensity of the measurement data becomes equal to or higher than a predetermined level. In this aspect, the ground height can be estimated with high accuracy based on the symmetry of the reflection intensity.

In another aspect of the information processing device described above, the detection means detects a plurality of areas in which the reflection intensity is equal to or higher than a predetermined value, and detects a pair of areas satisfying a range condition indicating a pair in a vertical direction from the plurality of areas. In this aspect, the ground height is estimated using the pair of areas which are paired in the vertical direction.

In another aspect of the information processing device described above, the acquisition means acquires point cloud information including a position and reflection intensity for each measurement point as the measurement data, and the detection means detects an area including a predetermined number or more measurement points at which reflection intensity is equal to or higher than the predetermined value within a predetermined range as a block area, and detects an upper block area and a lower block area to be a pair in the vertical direction as the pair of areas. In this aspect, the pair of areas is detected using the block area of the measurement point.

In another aspect of the information processing device described above, the detection means determines a representative point of the upper block area and a representative point of the lower block area, and detects the upper block area and the lower block area for which the representative points satisfy the range condition as the pair of areas. In this aspect, the pair of areas is detected using the representative point for each block area.

In another aspect of the information processing device described above, the estimation means calculates a difference between a newly estimated ground height and a past ground height, and dose not adopt the newly estimated ground height when the difference is equal to or larger than a predetermined allowable difference value. In this aspect, it is possible to remove an abnormal value caused by sudden noise or the like.

In another aspect of the information processing device described above, the acquisition means acquires point cloud information including a position and reflection intensity for each measurement point as the measurement data, and the information processing device further comprises a removal means configured to remove the measurement point located below the ground height among the measurement data. In this aspect, it is possible to remove the erroneously sensed point cloud from the point cloud information using the estimated ground height.

In another aspect of the information processing device described above, the acquisition means acquires point cloud information including a position and reflection intensity for each measurement point as the measurement data, and the information processing device further comprises an object detection means configured to detect an object using the measurement point located above the ground height among the measurement data. In this aspect, it is possible to enhance accuracy of the object detection using the estimated ground height.

In another preferred embodiment of the present invention, the information processing method executed by the information processing device comprises: receiving reflected light corresponding to irradiation light and acquiring a measurement data; detecting a pair of areas for which symmetry of the measurement data becomes equal to or higher than a predetermined level; and estimating a height of a middle of the pair of areas as a ground height. According to this information processing method, even when the road surface is wet, the ground height can be estimated correctly.

In another preferred embodiment of the present invention, the program functions a computer as an acquisition means configured to receive reflected light corresponding to irradiation light and acquire a measurement data, a detection means configured to detect a pair of areas for which symmetry of the measurement data becomes equal to or higher than a predetermined level, and an estimation means configured to estimate a height of a middle of the pair of areas as a ground height. By executing this program on the computer, the above-described information processing device can be realized. The program can be recorded and handled on a recording medium.

EXAMPLES

Preferred examples of the present invention will be described with reference to the accompanying drawings.

[Device Configuration]

FIG. 1 shows a schematic configuration of a lidar 100 according to this example. The lidar 100 is mounted on a vehicle that performs a driving assistance such as an autonomous driving. The lidar 100 measures a distance from the lidar 100 to an object discretely and generates point cloud information indicating a three-dimensional position of the object, by irradiating laser light (also referred to as irradiation light) for a predetermined angle range in a horizontal direction and a vertical direction and receiving the light returned after the irradiation light is reflected by the object (also referred to as reflected light). The lidar 100 is installed so as to include at least a forward direction of the vehicle in a measurement range.

As shown in FIG. 1, the lidar 100 mainly includes a transmission unit 1, a reception unit 2, a beam splitter 3, a scanner 5, a piezoelectric sensor 6, a control unit 7, and a memory 8.

The transmission unit 1 is a light source for emitting pulsed irradiation light toward the beam splitter 3. The transmission unit 1 includes, for example, an infrared laser emitting element. The transmission unit 1 is driven based on a drive signal Sg1 supplied from the control unit 7.

The reception unit 2 is, for example, an avalanche photodiode. The reception unit 2 generates a detection signal Sg2 corresponding to a received light quantity, and supplies the generated detection signal Sg2 to the control unit 7. The beam splitter 3 transmits the pulsed irradiation light emitted from the transmission unit 1. Further, the beam splitter 3 reflects the reflected light incident through the scanner 5 toward the reception unit 2.

The scanner 5 is, for example, an electrostatic drive type mirror (MEMS mirror). Based on a drive signal Sg3 supplied from the control unit 7, an inclination (i.e., an angle of optical scan) is changed within a predetermined range. The scanner 5 reflects the irradiation light transmitted through the beam splitter 3 toward the outside of the lidar 100 and emits the reflected light incident from the outside of the lidar 100 toward the beam splitter 3. A point where the irradiation light is irradiated in a measurement range of the lidar 100 is also referred to as a "measurement point".

The scanner 5 is provided with the piezoelectric sensor 6. The piezoelectric sensor 6 detects strain caused by stress of a torsion bar supporting a mirror part of the scanner 5. The piezoelectric sensor 6 supplies a generated detection signal Sg4 to the control unit 7. The detection signal Sg4 is used to detect an orientation of the scanner 5.

The memory 8 is composed of various volatile memories and non-volatile memories such as a RAM (Random Access Memory), a ROM (Read Only Memory), a flash memory. The memory 8 stores programs required for executing a predetermined processing by the control unit 7. The memory 8 stores various parameters referred to by the control unit 7. Further, the memory 8 stores the point cloud information of the latest predetermined number of frames generated by the control unit 7.

The control unit 7 includes various processors such as, for example, a CPU (Central Processing Unit), a GPU (Graphics Processing Unit). The control unit 7 executes a predetermined processing by executing the program stored in the memory 8. The control unit 7 is an example of a computer for executing the program. Incidentally, the control unit 7 is not limited to be realized by software by the program, and may be realized by any combination of hardware, firmware, and software or the like. The control unit 7 may also be a user-programmable integrated circuit, such as a FPGA (field-programmable gate array) or a microcontroller, ASSP (Application Specific Standard Produce), ASIC (Application Specific Integrated Circuit), etc.

The control unit 7 functionally includes a transmission driving block 70, a scanner driving block 71, a point cloud information generation block 72, and a point cloud information processing block 73.

The transmission driving block 70 outputs the drive signal Sg1 for driving the transmission unit 1. The drive signal Sg1 includes a light emission time of a laser light emitting element included in the transmission unit 1, and information for controlling an emission intensity of the laser light emitting element. The transmission driving block 70 controls the emission intensity of the laser light emitting element included in the transmission unit 1 by using the drive signal Sg1.

The scanner driving block 71 outputs the drive signal Sg3 for driving the scanner 5. The drive signal Sg3 includes a horizontal drive signal corresponding to a resonant frequency of the scanner 5 and a vertical drive signal for a vertical scanning. The scanner driving block 71 detects a scan angle (that is, an emission direction of the irradiation light) of the scanner 5 by monitoring the detection signal Sg4 outputted from the piezoelectric sensor 6.

The point cloud information generation block 72 generates the point cloud information indicating a distance and a direction to the object irradiated with the irradiation light for each measurement point, using the lidar 100 as a reference point, based on the detection signal Sg2 supplied from the reception unit 2. In this case, the point cloud information generation block 72 calculates a time from the emission of the irradiation light to the detection of the reflected light by the reception unit 2 as a time of flight of the light (Time of Flight). Then, the point cloud information generation block 72 generates the point cloud information indicating the distance corresponding to the calculated flight time and the irradiation direction of the irradiation light corresponding to the reflected light received by the reception unit 2 for each measurement point, and supplies the generated point cloud information to the point cloud information processing block 73. Hereafter, the point cloud information obtained by one scanning for all measurement points is defined as the point cloud information for one frame. The point cloud information is an example of a measurement data.

Here, the point cloud information can be regarded as an image in which the measurement point corresponds to a pixel and the distance indicated by each measurement point corresponds to a pixel value. In this case, each measurement point has the different irradiation direction of the irradiation light in an elevation/depression angle in a vertical alignment and the different irradiation direction of the irradiation light in a horizontal angle in a horizontal alignment. Hereafter, a XYZ coordinate system is defined by regarding the horizontal direction of the image as a "Y axis", the vertical direction (i.e., a height direction) of the image as a "Z axis", and the distance indicated by the pixel value (i.e., the distance from the lidar 100 in a depth direction) as a "X axis". Hereafter, the XYZ coordinate system is assumed to be a three-dimensional coordinate system with a position of the lidar 100 as an origin. Further, the point cloud information includes information of a reflection intensity for each pixel (i.e., received light intensity of each measurement point).

Incidentally, the point cloud information generation block 72 may generate the point cloud information obtained by removing a data generated by erroneously detecting the object from the point cloud information (so-called erroneous alarm data). Hereafter, the measurement point corresponding to a data generated by detecting the existing object is also referred to as "valid point". In this case, the point cloud information further includes a flag information indicating whether or not the measurement point is the valid point, for each measurement point.

The point cloud information processing block 73 estimates a height of a ground (hereinafter, also referred to as "ground height") based on the point cloud information supplied from the point cloud information generation block 72. Specifically, the point cloud information processing block 73 estimates the ground height based on the point cloud information obtained from the measurement range including a front of the vehicle in which the lidar 100 is mounted.

In the above-described configuration, the reception unit 2 is an example of an acquisition means, and the control unit 7 is an example of a detection means and an estimation means.

The point cloud information stored in the memory 8 may be outputted to a device for controlling a driving assistance such as autonomous driving of the vehicle (also referred to as "driving assistance device"), for example. In this instance, the driving assistance device may be, for example, an ECU (Electronic Control Unit) of the vehicle, or may be an on-board device such as a car navigation device electrically connected to the vehicle.

[Estimation Method of the Ground Height]

Next, an estimation method of the ground height will be described. The ground height becomes important information in detecting and identifying objects existing in the surroundings of the vehicle using the lidar. For example, even when the lidar detects a roof of a preceding vehicle as the object, it is impossible to distinguish whether the object is the roof of the vehicle or the ground without the information of the ground height. Therefore, the control unit 7 estimates the ground height based on the point cloud information measured by the lidar.

However, if a road surface (ground) is wet due to an influence of rainfall or the like, since specular reflection by the road surface is large, a number of measurement points obtained by the lidar 100 will be greatly reduced, and it is difficult to estimate the ground height. Therefore, in the present example, the control unit 7 estimates the ground height by using the specular reflection of a reflector by the road surface.

Figure 2A:
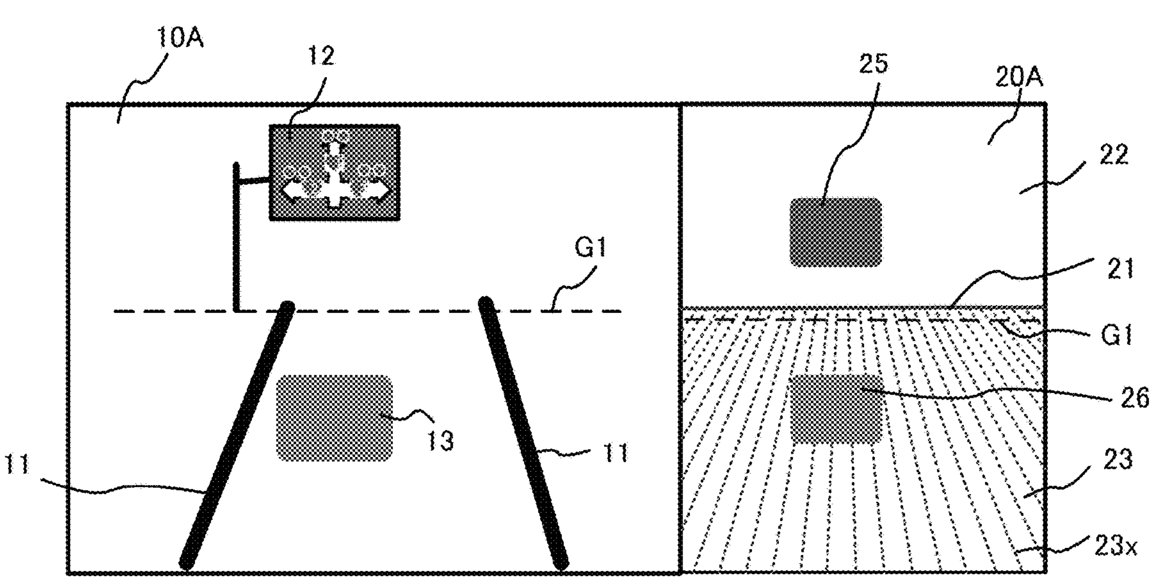
FIGS. 2A and 2B are diagrams for explaining a method of estimating a ground height.

FIG. 2A shows an image 10A in front of the vehicle and an example of a point cloud display 20A obtained by the lidar 100. Incidentally, in the example of FIG. 2A, the road surface is assumed to be in a wet condition due to rainfall or the like. The image 10A is an image capturing the front of the vehicle on which the lidar 100 is mounted, and includes border lines 11 indicating a lane the vehicle is traveling and a direction sign 12 installed on the road. Further, since the road surface is wet, the image 10A includes a mirror image 13 which is created by the specular reflection of the direction sign 12 by the wet road surface.

The point cloud display 20A displays the point cloud information obtained by the lidar 100. It is assumed that the point cloud information is generated by removing, from all point cloud information generated by the lidar 100, the data generated by erroneously detecting the object as described above (i.e., false alarm data). In FIG. 2A, an area of the point cloud is displayed in a darker (close to black) color as the reflection intensity is large. The point cloud display 20A includes a horizon 21. In the point cloud display 20A, a back side of the horizon 21 is an above ground area 22 including a sky, and a front side of the horizon 21 is a road surface area 23. In the road surface area 23, for convenience, supplemental lines 23x indicating the traveling direction of the vehicle are displayed by the broken lines.

The point cloud display 20A includes a point cloud 25 at a position corresponding to the direction sign 12 included in the image 10A. Since the direction sign 12 is a high reflectance reflector, the direction sign 12 is detected as the point cloud 25 of a large reflection intensity value. The point cloud display 20A also includes a point cloud 26 corresponding to the mirror image 13 in the image 10A. The point cloud 26 is detected as an area of the large reflection intensity value created by the specular reflection of the direction sign 12 by the wet road surface.

Figure 2B:
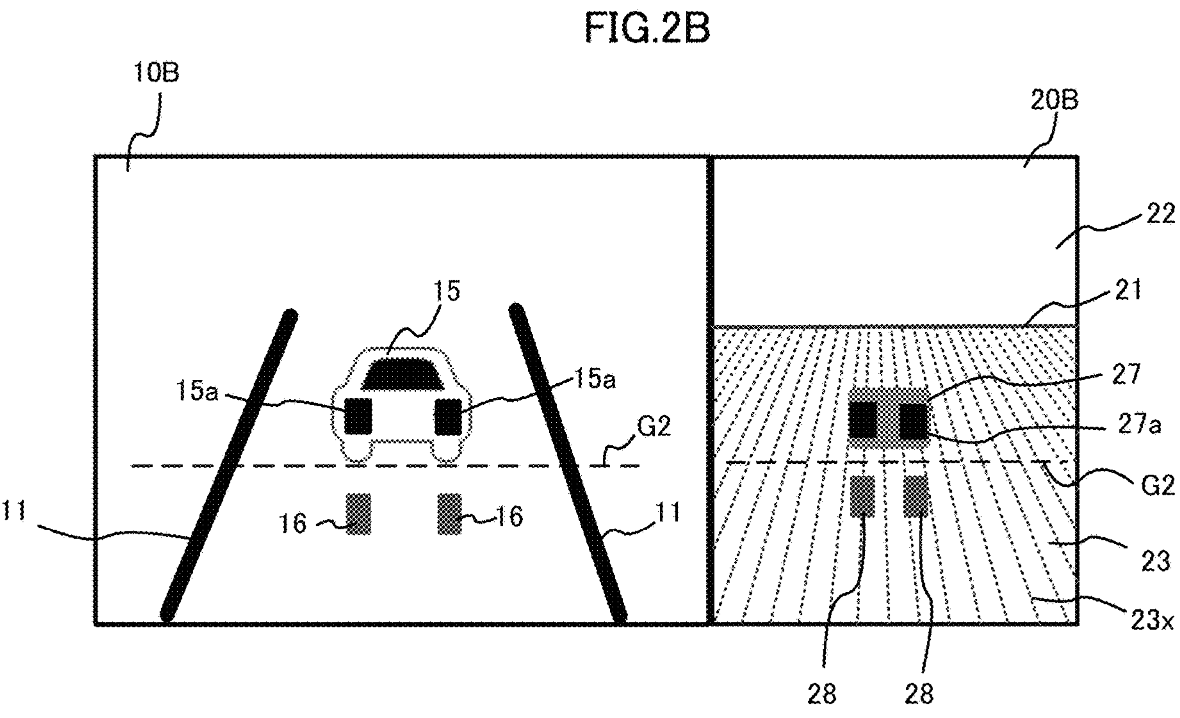

FIG. 2B shows an image 10B in front of the vehicle and another example of a point cloud display 20B obtained by the lidar 100. In the example of FIG. 2B, the road surface is assumed to be in a wet condition due to rainfall or the like. The image 10B is an image capturing the front of the vehicle on which the lidar 100 is mounted, and includes the border lines 11 indicating the lane that the vehicle is traveling and a preceding vehicle 15. Reflectors 15a are provided at the back of the preceding vehicle 15. Further, since the road surface is wet, the image 10B includes mirror images 16 which are created by specular reflection of the reflectors 15a by the wet road surface.

The point cloud display 20B displays the point cloud information obtained by the lidar 100. The point cloud display 20B shows the point cloud after removing the false alarm data from all point cloud information. Also, in FIG. 2B, the area of the point cloud is displayed in the darker color as the reflection intensity is large. Similar to FIG. 2A, the point cloud display 20B includes the horizon 21, the above ground area 22, and the road surface area 23. In the road surface area 23, the supplemental lines 23x indicating the traveling direction of the vehicle are shown.

The point cloud display 20B includes a point cloud 27 at the position corresponding to the preceding vehicle 15 included in the image 10B. The preceding vehicle 15 is detected as the point cloud 27 of the large reflection intensity value. Further, among the point cloud 27 corresponding to the preceding vehicle 15, the point clouds 27a corresponding to the reflectors 15a have particularly high reflection intensity. The point cloud display 20B includes point clouds 28 at the positions corresponding to the mirror images 16 in the image 10B. The point cloud 28 is detected as the area of the large reflection intensity value which is created by specular reflection of the reflector 15a by the wet road surface.

Thus, when the road surface is wet, a highly reflective object (reflector) such as the direction sign 12 and the reflector 15a is specularly reflected by the road surface, and is detected as the area of the large reflection intensity value generated by the specular reflection (hereinafter, also referred to as "specular reflection area"). Here, the object having high reflectivity and its specular reflection area have a relation of line symmetry with the horizontal line indicating the ground height as an axis. Specifically, when the ground height at the position where the direction sign 12 is installed is indicated by "G1" in the image 10A of FIG. 2A, the ground height G1 is positioned in the middle between the point cloud 25 corresponding to the direction sign 12 and the point cloud 26 corresponding to the mirror image 13 of the direction sign 12 in the height direction, as shown in the point cloud display 20A. Similarly, when the ground height at the position of the preceding vehicle 15 is indicated by "G2" in the image 10B of FIG. 2B, the ground height G2 is positioned in the middle between the point cloud 27a corresponding to the reflector 15a and the point cloud 28 corresponding to the mirror image 16 of the reflector 15a in the height direction, as shown in the point cloud display 20B.

Therefore, the control unit 7 of the lidar 100 detects a pair of areas for which the symmetry of a three-dimensional coordinate values in the height direction is higher than a predetermined level from the point cloud information after removal of the false alarm data i.e., a pair of areas for which the symmetry of reflection intensity is higher than a predetermined level. Specifically, the control unit 7 detects a data having a large reflection intensity value and paired in the height direction, and estimates the height in the middle of them as the ground height at that position. Thus, it is possible to estimate the ground height correctly even when the road surface is wet and the point cloud information that can be ranged by the lidar is reduced.

[Ground Height Estimation Processing]

Figure 3:
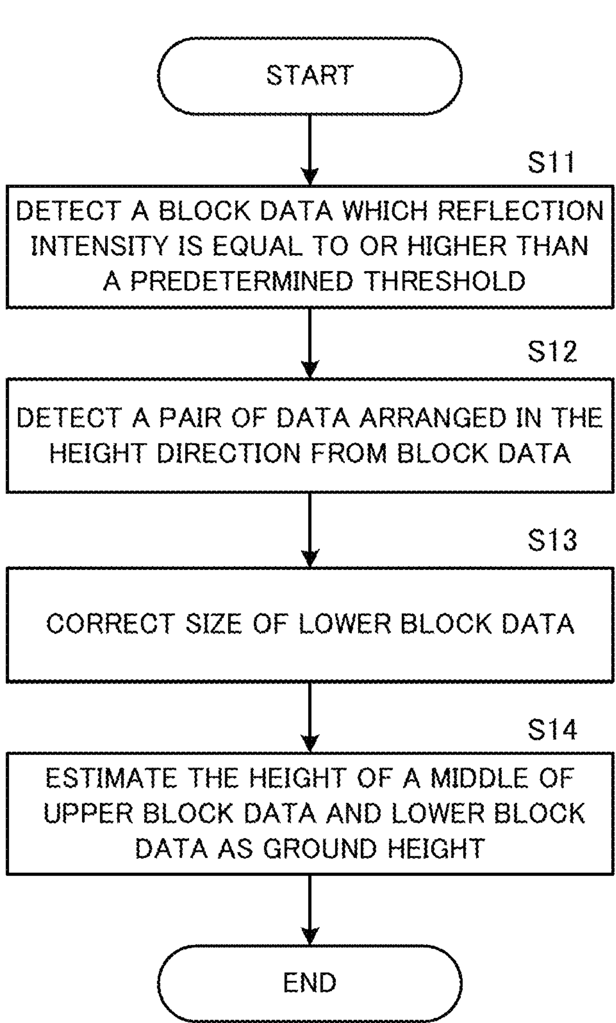
FIG. 3 is a flowchart of an estimation processing of the ground height.

FIG. 3 is a flowchart of a ground height estimation processing by the lidar 100. This processing is realized by the control unit 7 shown in FIG. 1, which executes the program prepared in advance.

First, the control unit 7 generates the point cloud information after removal of the false alarm data based on the detection signal Sg2 inputted from the reception unit 2, and detects a point cloud that is a mass or block of measurement points of which reflection intensity is equal to or higher than a predetermined threshold (hereinafter, referred to as "block data") (step S11). Specifically, the control unit 7 detects the point cloud, in which the measurement points having reflection intensity equal to or higher than a predetermined threshold value are collected a predetermined number or more within a predetermined area in the above-described XYZ coordinate system described above, as the block data. The predetermined threshold value and the predetermined number are determined in advance by experiments.

Next, the control unit 7 detects a pair of data arranged in the height direction (Z-axis direction) (hereinafter, also referred to as "pair data") from the plurality of block data obtained (step S12). Hereinafter, the block data on the upper side is referred to as "upper block data" and the block data on the lower side is referred to as "lower block data", among the block data on the upper and lower sides constituting the pair data. Incidentally, the block data is an example of a block area, the upper block data is an example of an upper block area, the lower block data is an example of a lower block area.

Specifically, the control unit 7 first calculates a representative point for each block data. For example, the control unit 7 assumes one of the plurality of block data obtained as the upper block data, and determines the point, which is located at the center of the point cloud constituting the upper block data in the depth direction (X-axis direction) and the horizontal direction (Y-axis direction) and located at the lowermost point in the height direction (Z-axis direction), as the representative point of the upper block data. Next, the control unit 7 assumes all the remaining block data as the lower block data, and determines the point, which is located at the center of the point cloud constituting each lower block data in the depth direction and the horizontal direction and located at the uppermost point in the vertical direction, as the representative point of each lower block data.

Then, when the representative point of the upper block data and the representative point of the lower block data satisfy a predetermined XYZ range condition in the XYZ coordinate system, the control unit 7 determines the upper block data and the lower block data as the pair data. For example, the predetermined XYZ range condition is determined within an error range for the depth direction (X-axis direction) and the horizontal direction (Y-axis direction), and within a predetermined height range for the height direction (Z-axis direction) in advance. Thus, the control unit 7 assumes all of the block data as the upper block data in order, and looking for the lower block data to be paired with the upper block data to detect the pair data from the plurality of block data.

Next, the control unit 7 corrects the size of the lower block data (step S13). Specifically, the control unit 7 removes blur portions included in the lower block data using the upper block data. As described above, the lower block data is the area of the reflector such as a directional sign specularly reflected by the wet road surface, and its peripheral portion tends to be detected as an expanded area larger than the original reflector. A portion which expanded larger than the original reflector is called the blur portion. If the lower block data includes the blur portion, an error occurs in the estimated ground height according to the size of the blur portion in the height direction. Therefore, the control unit 7 corrects the size of the lower block data.

Normally, among the pair data detected in step S12, the upper block data is detected as a direct reflection of the original reflector, and the error of magnitude in the upper block data is small. Therefore, the control unit 7 removes the blur portion from the lower block data based on the reflection intensity value and the size of the upper block data, and corrects the size of the lower block data. For example, the control unit 7 may remove the peripheral area of the lower block data so that the size of the lower block data becomes approximately equal to the size of the upper block data. Further, the control unit 7 may correct the size of the lower block data in consideration of the fact that the reflection intensity value of the lower block data is smaller than the reflection intensity value of the upper block data.

Next, the control unit 7 estimates the height of the middle of the upper block data and the lower block data included in the pair data as the ground height at the position in the depth direction (X-axis direction) (step S14). For example, the control unit 7 calculates the ground height H as follows.

$$H=\{(Z\text{ coordinate of representative point of upper block data})+(Z\text{ coordinate of representative point of lower mass data})\}/2$$

Then, the control unit 7 outputs the calculated ground height H and ends the ground height estimation processing.

Basically, the control unit 7 may perform the above ground height estimation processing continuously while the vehicle is running. However, when using only a road sign such as a direction sign as the reflector, the control unit 7 may detect a point where the road sign is present with reference to the map data, and may perform the above processing for each point.

As described above, according to the present example, even when the road surface is wet due to rain or the like, by using the specular reflection of the reflector, it is possible to estimate the ground height accurately. Also, in this technique, if the pair data can be detected, an object discrimination processing for discriminating whether the original reflector is the direction sign or the reflector is not necessary. Therefore, there is an advantage that ground height can be estimated efficiently.

Modifications

Next, modifications relating to the above-described height estimation processing will be described. The following modifications can be applied in appropriate combination.

Modification 1

In the above-described height estimation processing, when the ground height H is calculated in step S14, the control unit 7 may determine whether or not the calculated ground height H is an abnormal value by using the ground height obtained in the past. Specifically, the control unit 7 calculates a difference between the calculated ground height H and the value of the ground height H' obtained in the past. Then, the control unit 7 adopts the ground height H obtained when the calculated difference is smaller than or equal to a predetermined allowable difference value, and does not adopt the obtained ground height when the difference is equal to or greater than the allowable difference value. Thus, it is possible to prevent the other processing that adopts an abnormal ground height obtained due to sudden noise or the like.

Modification 2

In the above-described step S12 of the height estimation processing, the control unit 7 may detect the pair data by using the XYZ range condition that differs for each type of the reflector to be used. As understood from FIGS. 2A and 2B, between the case of using the direction sign as the reflector and the case of using the reflector of the vehicle, there is a difference in the distance in the height direction between the upper block data and the lower block data constituting the pair data. Therefore, the XYZ range condition used to detect the pair data in step S12 may be prepared for each type of reflector. More specifically, for each type of the reflector, the XYZ range condition may be determined by considering the height at which the reflector of that type generally exists.

Modification 3

In the above-described height estimation processing, it is possible to estimate the ground height at the point where the reflector such as the direction sign or the reflector of the vehicle exists, but it is impossible to estimate the ground height at a point where the reflector does not exist. Therefore, the control unit 7 may obtain the ground height at the point where the reflector does not exist by interpolation based on the ground heights of the estimated plurality of points and an installation condition of the lidar 100 in the vehicle.

[Processing Using the Ground Height]

Next, the processing using the ground height estimated by the above method will be described. According to this example, even when the road surface is wet, the ground height can be estimated. Therefore, it is possible to accurately execute the following processing.

(False Alarm Data Removal)

The estimated ground height can be used for removal of the false alarm data. The removal of the false alarm data, as described above, refers to removing the point cloud generated by erroneously detecting the object, from all the point clouds ranged by the lidar 100. Specifically, among all the point clouds the lidar 100 generates, the control unit 7 may remove the point cloud appeared below the estimated ground height as the false alarm data. In this case, the control unit 7 is an example of a removal means.

(Object Detection/Obstacle Detection)

The estimated ground height can be used for object detection and obstacle detection. Specifically, among the point clouds after removal of the false alarm data, the control unit 7 can determine the point cloud existing above the estimated ground height as the point cloud constituting the object or the obstacle. In this case, the control unit 7 is an example of an object detection means.

(Object Identification)

The estimated ground height can be used for object identification. When the object is identified based on a photographed image of the vehicle front or the point cloud that the lidar has measured, the success or failure of the identification result can be determined by using a constraint condition based on the estimated ground height. For example, since the height of a person is at most 2 m, when the object to be identified is a pedestrian, the constraint condition that the height is within 2 m from the ground is used. The control unit 7 determines whether or not the height of the object determined to be the pedestrian by the object identification is equal to or smaller than 2 m using the estimated ground height. When the height is larger than 2 m, the control unit 7 can determine that the identification result is erroneous. Incidentally, not limited to pedestrians, also for the vehicles and the other objects, if the general height is known, it is possible to prevent an erroneous identification using the height as the constraint condition.

While the present invention has been described with reference to the embodiments and examples, the present invention is not limited to the above embodiments and examples. Various changes which can be understood by those skilled in the art within the scope of the present invention can be made in the configuration and details of the present invention. That is, the present invention includes, of course, various modifications and modifications that may be made by a person skilled in the art according to technical concepts and the entire disclosure including the scope of claims. In addition, each disclosure of the above-mentioned patent documents cited shall be incorporated by reference in this document.

DESCRIPTION OF SYMBOLS

1 Transmission unit
2 Reception unit
3 Beam splitter
5 Scanner
6 Piezoelectric sensor
7 Control unit
8 Memory
100 Lidar

The invention claimed is:

1. An information processing device comprising:
a memory configured to store instructions; and
one or more processors configured to execute the instructions to:
receive reflected light corresponding to outgoing light and acquire a measurement data;
detect a pair of areas symmetry of the measurement data becomes a predetermined or more; and
estimate a height of a middle of the pair of areas as a height of a ground.

2. The information processing device according to claim 1, wherein the one or more processors detect a pair of areas at least symmetry of a reflection intensity of the measurement data becomes a predetermined or more.

3. The information processing device according to claim 2, wherein the one or more processors detect a plurality of areas in which the reflection intensity is equal to or greater than a predetermined value, and a pair of areas satisfying a range condition indicating that a pair in a vertical direction from the plurality of areas.

4. The information processing device according to claim 3,
wherein the one or more processors acquire point cloud information including a position and reflection intensity for each measurement point as the measurement data;
wherein the one or more processors detect an area including a predetermined number or more measurement points reflection intensity is a predetermined value or more within a predetermined range as a mass area, and an upper mass area and a lower mass area to be a pair in the vertical direction as the pair of areas.

5. The information processing device according to claim 4, wherein the one or more processors determine a representative point of the upper mass area and a representative point of the lower mass area and detects the upper mass area and the lower mass area satisfying the range conditions as the pair of areas.

6. The information processing device according to claim 1, wherein the one or more processors calculate a difference between a height of a newly estimated ground and a height of a past ground and do not adopt the height of the newly estimated ground when the difference is equal to or more than a predetermined allowable difference value.

7. The information processing device according to claim 2,
wherein the one or more processors acquire point cloud information including a position and reflection intensity for each measurement point as the measurement data; and
wherein the one or more processors are further configured to remove the measurement point located below the height of the ground among the measurement data.

8. The information processing device according to claim 2,
wherein the one or more processors acquire point cloud information including a position and reflection intensity for each measurement point as the measurement data; and
wherein the one or more processors are further configured to detect an object using the measurement point located above the height of the ground among the measurement data.

9. An information processing method executed by the information processing device comprising:
receiving reflected light corresponding to outgoing light and acquiring a measurement data;
detecting a pair of areas symmetry of the measurement data becomes a predetermined or more; and
estimating a height of a middle of the pair of areas as a height of a ground.

10. A non-transitory computer-readable recording medium recording a program which causes a computer to execute processing of:
receiving reflected light corresponding to outgoing light and acquiring a measurement data;
detecting a pair of areas symmetry of the measurement data becomes a predetermined or more; and estimating a height of a middle of the pair of areas as a height of a ground.

* * * * *